P. J. SCHARBACH.
POTATO DIGGER AND SEPARATOR.
APPLICATION FILED SEPT. 9, 1911.
1,046,224.
Patented Dec. 3, 1912.
4 SHEETS—SHEET 1.
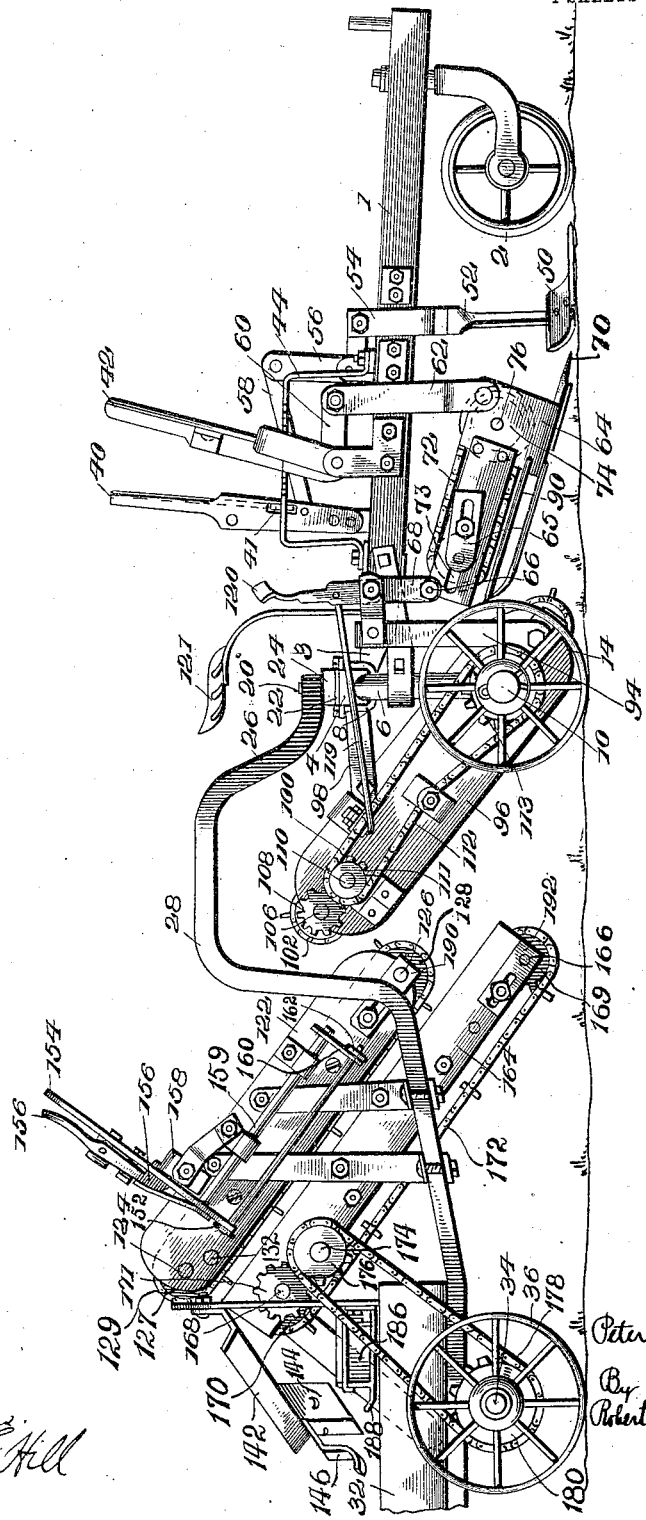

P. J. SCHARBACH.
POTATO DIGGER AND SEPARATOR.
APPLICATION FILED SEPT. 9, 1911.
1,046,224.
Patented Dec. 3, 1912.
4 SHEETS—SHEET 2.
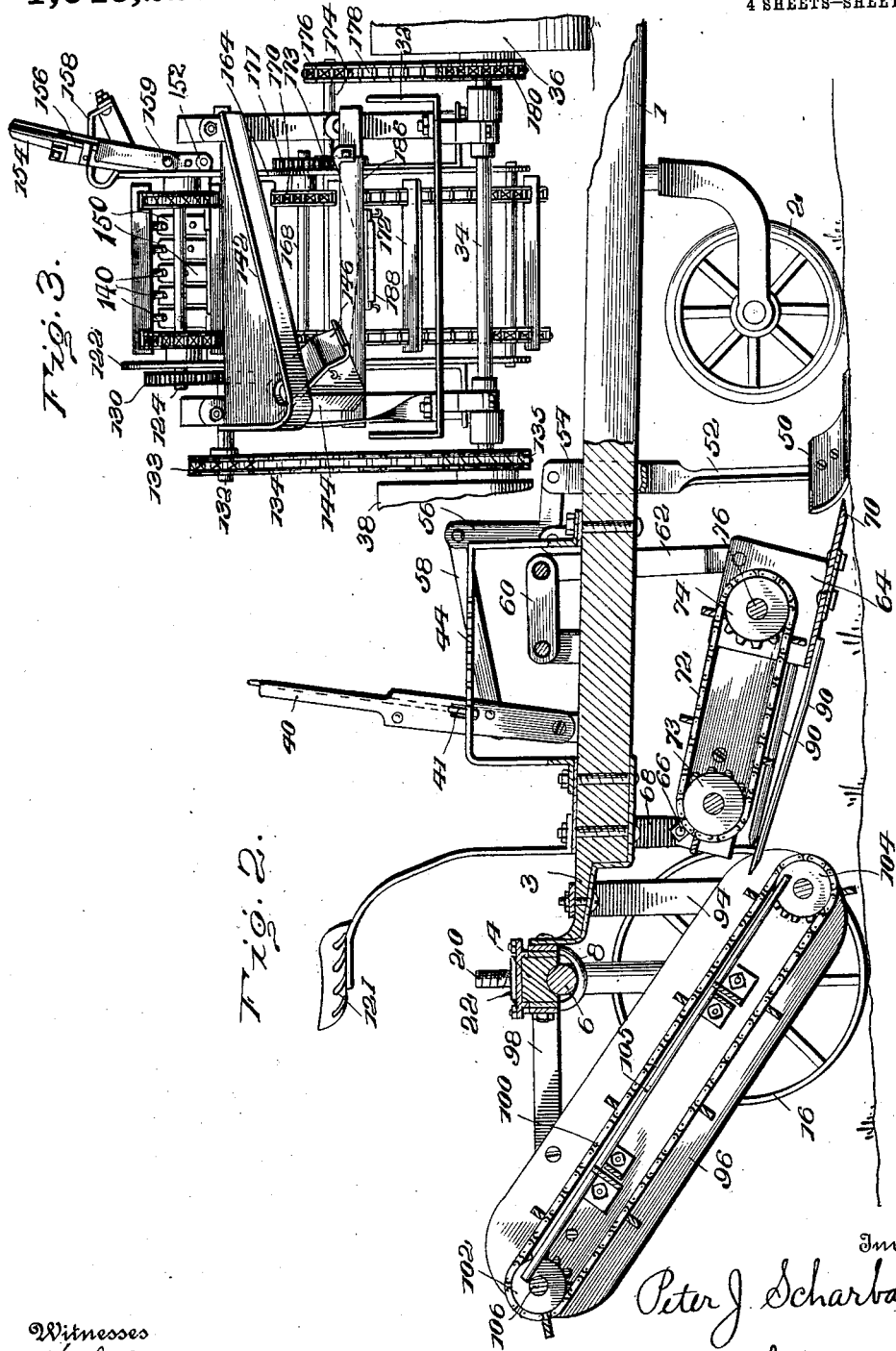
Witnesses

P. J. SCHARBACH.
POTATO DIGGER AND SEPARATOR.
APPLICATION FILED SEPT. 9, 1911.
1,046,224.
Patented Dec. 3, 1912.
4 SHEETS—SHEET 3.
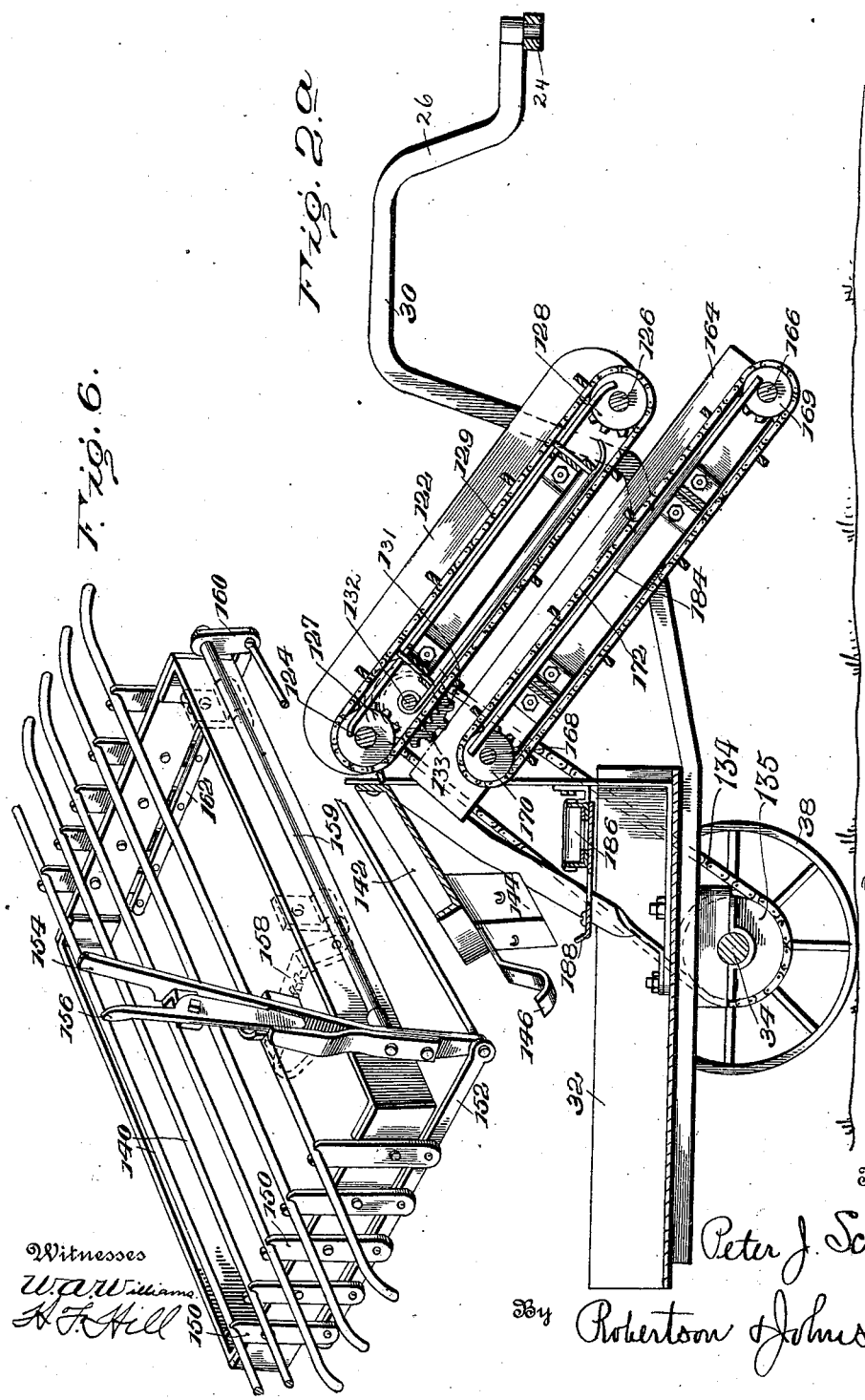

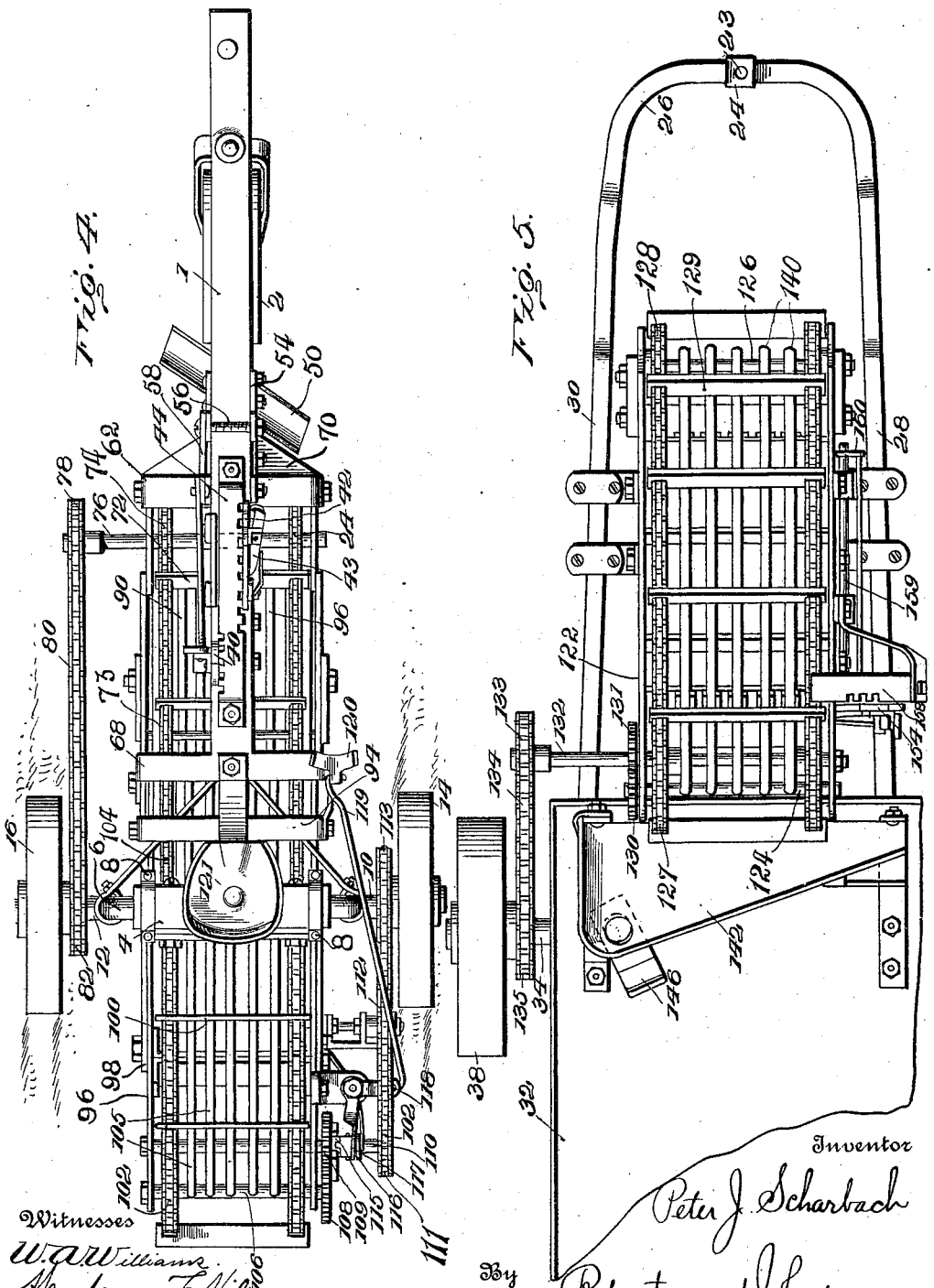

UNITED STATES PATENT OFFICE.

PETER J. SCHARBACH, OF SAN FRANCISCO, CALIFORNIA.

POTATO DIGGER AND SEPARATOR.

1,046,224.                    Specification of Letters Patent.        Patented Dec. 3, 1912.

Application filed September 9, 1911. Serial No. 648,483.

*To all whom it may concern:*

Be it known that I, PETER J. SCHARBACH, a citizen of the United States, and a resident of San Francisco, in the county of San Francisco and State of California, have invented certain new and useful Improvements in Potato Diggers and Separators, of which the following is a specification.

This invention relates to improvements in combined potato diggers and separators of that type in which there is employed a top cutting knife behind which is a scoop or plow adapted to gather the potatoes and with which co-acts an endless elevating carrier to move the potatoes over a screening device and onto an elevating device which elevates the potatoes to a separating device so that one operator by the use of a combined machine is enabled to cut the tops of the potatoes, dig the potatoes, separate the potatoes from the earth, elevate the potatoes onto a separating device, and then separate and grade the potatoes according to the sizes desired. In the preferred embodiment of my invention I accomplish all this work by having two sets of wheels, one wheel of the forward set driving the conveyer behind the plow and the other wheel of the forward set driving the elevator, while one wheel of the rear set drives one of the separator elevators and the other wheel of the rear set drives the elevator of the other separator.

The invention therefore consists in the potato digger and separator hereinafter described and then definitely claimed.

In the drawings accompanying and forming part hereof: Figure 1 is a side elevation of my combined potato digger and separator. Fig. 2 is a longitudinal vertical section of the digging apparatus. Fig. 2ª is a similar section of the separating apparatus which is shown disconnected from the digging apparatus illustrated in Fig. 2 in order that the parts may be shown on a larger scale. Fig. 3 is a rear view of part of the machine. Figs. 4 and 5 are respectively top plans of the digging and separating apparatus, these parts being shown separated in order to illustrate them on a larger scale. Fig. 6 is a perspective view of one of the grading devices.

Referring now to the details of the drawings by numeral: 1 designates the main frame, the forward end of which is carried by a caster wheel 2 and the rear end 3 of the frame being secured to a cross frame 4 to which the axle frame 6 is secured by U-shaped members 8. The axle frame 6 has its ends bent into two stub axles 10 and 12 on which are journaled the forward ground wheels 14 and 16 illustrated in Fig. 4, these ground wheels being independently journaled for a purpose to be hereinafter described. Secured to the top of the cross frame 4 is a bolster 22 on which rests a bolster block 24 secured to the forward end of the separator frame 26, the bolster 22 having a king pin 20 which passes through an opening 23 in the bolster block 24 (see Fig. 5), so that the forward end of the frame 26 rests upon the bolster 22 in a manner well understood. The aforesaid frame 26 is of the peculiar shape shown in Figs. 1 and 5 and comprises two reaches 28 and 30, the rear ends of these reaches supporting a truck body 32, and said truck body and the ends of the reaches being carried by an axle 34 which in turn is supported by ground wheels 36 and 38, these ground wheels being also independently journaled on the axle 34 for a purpose to be hereinafter explained.

Referring now once more to the main frame 1, this frame has two hand levers 40 and 42 pivotally secured to it, on opposite sides of a rack 44, the arrangement being such that the hand lever 40 has a spring pawl 41 co-acting with teeth on one side of the rack 44 while the hand lever 42 is provided with a pawl 43 co-acting with the teeth on the other side of the rack 44, as clearly seen in Figs. 1, 2 and 4. The hand lever 40 is for the purpose of elevating or lowering the top cutting knife 50 illustrated in Figs. 1 and 2, this knife being detachably secured to a vertically movable frame 52 whose upper forked end 54 straddles the main frame 1 and is connected to a bell crank lever 56 which is connected by a link 58 to the hand lever 40; the construction being such that the operator may elevate or raise the top cutting knife 50 by moving the hand lever 40. The top cutting knife 50 is detachable and reversible: that is, both of its edges are sharpened so that the knife may be detached and reversed, thus providing two cutting edges; and as it is detachable, these edges may be sharpened whenever desired.

The other handle 42 is connected by means of links 60 and 62 with a pivoted frame 64, this frame being pivoted at 66 to a transverse frame 68 projecting downwardly from the main frame 1 as indicated in Figs. 1 and 2. This frame 64, whose forward end may be elevated or lowered by means of the hand lever 42, is provided at its forward end with a detachable plow 70. This plow in Figs. 1 and 2 is shown about on a level with the top cutting knife 50 but it will be understood that in operation it is lowered sufficiently to cut deep enough to go beneath the potatoes so that as the machine draws the plow 70 forward, said plow scoops up the potatoes onto the bottom of the frame 64 where the potatoes will come into the path of an endless carrier 72 supported by sprocket wheels 73 and 74 carried by the aforesaid frame 64, the forward sprocket wheels being secured to an axle 76 to which is secured a sprocket wheel 78 connected by a sprocket chain 80 with a sprocket wheel 82 fast on the hub of the ground wheel 16, the construction being such that motion from the ground wheel 16 is transmitted through the sprocket chain to the endless carrier 72 so that the potatoes which are scooped up by the plow 70 are carried to the rearward by the conveyer 72 over a grating consisting of a series of parallel rods 90 projecting from the bottom of the frame 64 under the conveyer 72, so that the dirt will pass through these rods 90 as the potatoes are fed over them by the conveyer 72. It will be noticed that the whole construction is such that the conveyer frame 64 and its plow 70 may be elevated or depressed by operating the hand lever 42 without in any way endangering the operation of the device, the aforesaid frame 64 and its conveyers moving on the pivot 66 so that the position of the sprocket wheel 78 with respect to the sprocket wheel 82 is not materially changed.

The main frame 1 also has secured to it a second downwardly projecting frame 94 to which is secured the forward end of an elevator frame 96, the rear end of this frame being supported by a supplemental frame 98 projecting from the rear of the cross frame 4. (See Fig. 2.) This elevator frame 96 is therefore stationary and contains an endless elevator 100 supported on sprocket wheels 102 and 104 (see Fig. 2) but which are arranged in operative relation to a series of sifter bars 105 so that the elevator 100, which has its forward end immediately under the rear end of the conveyer 72, will receive the potatoes from the conveyer and elevate them over the sifter bars 105 so that the potatoes may be delivered to the separator or grader illustrated in the rear end of Fig. 1. The sprocket wheel 102 is supported on a shaft 106 to the outer end of which is secured the gear 108 meshing with a second gear 109 secured to a shaft 110, the latter having a sprocket wheel 111 secured to it which receives power by means of a sprocket chain 112 from a sprocket wheel 113 secured to the ground wheel 14; the construction being such that when the machine is drawn forward the wheel 14 rotates the sprocket wheel 113 to drive the gears 108 and 109 to give motion to the elevator 100. Thus it will be seen that one ground wheel 14 operates the elevator 100 while the other ground wheel 16 independently operates the conveyer carried by the plow carrying frame 64.

It will be observed that when the combined machine is making a turn, the digger and elevator will be out of alinement with the grader at the rear of the elevator, and in order to prevent the potatoes from being fed over the elevator, from which they would drop to the ground, I provide a clutch 115 connecting the gear 109 of the elevator 100 with the sprocket wheel 102 so that when the member 116 of the clutch is moved away from the companion clutch member 115 the sprocket wheel 102 no longer drives the gear 109. A spring 117 is employed to normally hold the clutch members 115 and 116 in operative position, and to separate the said clutch members I employ a bell crank clutch lever 118 which is connected by means of a rod 119 with a foot lever 120, this last being located forward of the driver's seat 121 so that the driver may depress the foot lever 120 to separate the clutch members 115 and 116, and thereby stop the elevator, whenever it is desired to do so.

On the reaches 28, 30 of the rear frame 26 I support two separators or graders illustrated best in Figs. 1, 2ᵃ and 6. These separators or graders are arranged one over the other and the upper one, as before described, with its lower end in the proper position to receive potatoes from the elevator 100. The upper separator or grader comprises a frame 122 which supports two shafts 124 and 126 on which are two sprocket wheels 127 and 128 supporting an elevator 129, the upper shaft 124 having a gear 130 secured to it which meshes with a similar gear 131 on a shaft 132 to which shaft is also secured a sprocket wheel 133 having a sprocket chain 134 to receive motion from a sprocket wheel 135 fast on the hub of the ground wheel 38. Thus, as the machine travels along, power is transmitted from the ground wheel 38 to the shaft 132 and from thence to the shaft 124 so as to operate the elevator 129 in a manner easily understood. The potatoes which are delivered into the separator frame 122 are thus elevated by the elevator 129 and these potatoes as they are elevated pass along grading bars 140 illustrated best in Fig. 6. Thus as the elevator moves the potatoes upward along these bars 140, any potatoes which are small enough to pass between the bars will drop down into the separator below, while those that are too large to pass between the bars are carried to the upper end of the elevator 129 and pass over into a trough 142 which is provided with a spout 144 having a gate 146 so that the potatoes as they drop from this spout 144 may be placed in suitable receptacles placed in the truck 32.

In order that the potatoes may be graded in the sizes preferred, I arrange the bars 140 so that they may be adjusted with respect to each other. Thus each bar 140 is supported by a pivoted arm 150 and each of these arms 150 in turn is pivoted to an operating bar 152, each pivoted arm 150 being pivoted at a slightly greater distance from the bar 152 than the pivoted arm next to it so that as said bar 152 is moved to operate the pivoted arms 150, all of said arms will move in unison, each arm moving a little farther than the one next to it so that the spaces between the separator bars 140 are always uniform. I consider this of importance. In order to provide an easy means of operating the bar 152, I connect to it a hand lever 154 having a spring actuating pawl 156 co-acting with a fixed rack 158. The hand lever 154 is connected to a rock shaft 159 having a crank arm 160 at its opposite end and this crank arm 160 is connected to a bar 162 which is an exact duplicate of the bar 152 at the other end of the grader. Immediately underneath the upper grader is the lower separator which comprises a separator frame 164 which supports two shafts 166 and 168 on which are sprocket wheels 169 and 170 carrying an elevator 172, the shaft 168 being provided with a gear 171 meshing with a companion gear 173 fixed to a shaft 174 having a sprocket wheel 176 receiving motion from a sprocket chain 178 driven by a sprocket wheel 180 fast on the hub of the ground wheel 36. Thus this lower separator is driven from the ground wheel 36 while the upper grader is driven from the ground wheel 38 (see Fig. 3). The lower separator is of course provided with a series of parallel bars 184 shown in Fig. 2ª, and the potatoes are elevated upward along these bars, those which are too large to pass through the bars passing over the upper ends of the bars into a trough 186 provided with a gate 188, from which trough the potatoes may be delivered, when the gate is open, into suitable receptacles in the aforesaid truck 32.

Each of the separator frames 122 and 164 is provided with adjustable bearings 190 and 192 (see Fig. 1), by which the elevators may be suitably adjusted when necessary. The elevator on the plow frame 64 is also provided with a similar adjustable bearing 65, shown in Fig. 1.

It is believed that the operation of my combined digger and separator or grader has been sufficiently set forth in the detailed operation of the various parts, and that further description of the operation is therefore unnecessary.

What I claim as my invention is:

1. In a combined potato digger and separator, forward and rearward frames, a pair of ground wheels supporting the forward frame and the forward end of the rear frame, a second pair of ground wheels supporting the rear ends of the rear frame, a plow and two sets of conveyers supported by said forward frame, one of the forward ground wheels driving one of said conveyers and the other forward ground wheel independently driving the other conveyer, two sets of separators carried by the rear frame, one of the rear ground wheels operating one of said separators and the other rear ground wheel independently driving the other separator, substantially as described.

2. In a combined potato digger and separator, forward and rearward frames, a pair of ground wheels supporting the forward frame and the forward end of the rear frame, a second pair of ground wheels supporting the rear ends of the rear frame, a plow and two sets of conveyers supported by said forward frame, one of the forward ground wheels driving one of said conveyers and the other forward ground wheel independently driving the other conveyer, two sets of separators carried by the rear frame, said separators being located one over the other, and the upper one being located just at the rear and slightly under one of the conveyers carried by the forward frame, one of the rear ground wheels operating one of said separators and the other rear ground wheel independently driving the other separator, substantially as described.

3. In a combined potato digger and separator, forward and rearward frames, a pair of ground wheels supporting the forward frame and the forward end of the rear frame, a second pair of ground wheels supporting the rear ends of the rear frame, a plow and a screening conveyer supported by said forward frame, an elevator carried by said forward frame just at the rear of the screening conveyer, one of the forward ground wheels driving said screening conveyer and the other forward ground wheel independently driving the other elevator, two sets of separators carried by the rear frame, one of the rear ground wheels operating one of said separators and the other rear ground wheel independently driving the other separator, substantially as described.

4. In a combined potato digger and separator, forward and rear frames, a pair of ground wheels supporting the forward frame and the forward end of the rear frame, a second pair of ground wheels supporting the rear ends of the rear frame, a plow and a screening conveyer, an elevator carried by said forward frame just at the rear of the said screening conveyer, one of the forward ground wheels driving said screening conveyer and the other forward ground wheel independently driving said elevator; two sets of separators carried by the rear frame, one of the rear ground wheels operating one of said separators and the other rear ground wheel independently driving the other separator, and a clutch and clutch lever for throwing out of gear the elevator of the forward frame whereby the combined machine may be turned without feeding the potatoes, substantially as described.

5. In a combined potato digger and separator, forward and rear frames, a pair of ground wheels for each frame, a frame pivotally supported by said forward frame and carrying a plow at its forward end, a conveyer supported by said pivoted frame just at the rear of said plow to convey the potatoes scooped up by said plow, an elevator also carried by said frame arranged at the rear of said conveyer and arranged to receive potatoes therefrom and to elevate them, the conveyer being operated by one ground wheel of the forward frame and the elevator being operated by the other ground wheel of the forward frame, two sets of separators carried by said rear frame, one of said separators being immediately over the other, and the upper one arranged immediately at the rear of the delivery end of the elevator carried by the forward frame, one of said separators being driven by one of the rear wheels and the other separator being driven by the other rear wheel, substantially as described.

6. In a combined potato digger and separator, forward and rear frames, a pair of ground wheels for each frame, a frame pivotally supported by said forward frame and carrying a plow at its forward end, a conveyer supported by said pivoted frame just at the rear of said plow to convey the potatoes scooped up by said plow, an elevator also carried by said frame arranged at the rear of said conveyer and arranged to receive potatoes therefrom and to elevate them, the conveyer being operated from one ground wheel of the forward frame and the elevator being operated from the other ground wheel of the forward frame, two sets of separators carried by said rear frame, one of said separators being immediately over the other, and the upper one arranged immediately at the rear of the delivery end of the elevator carried by the forward frame, one of said separators being driven from one of the rear wheels and the other separator being driven from the other rear wheel, a trough and delivery chute for the upper separator and a trough and delivery chute for the lower separator, substantially as described.

In testimony whereof I affix my signature in presence of two witnesses.

PETER J. SCHARBACH.

Witnesses:
R. L. HUSTED,
S. F. BOTTOMFIELD.

---

Copies of this patent may be obtained for five cents each, by addressing the "Commissioner of Patents Washington, D. C."